United States Patent [19]
Fougerousse

[11] Patent Number: 5,787,703
[45] Date of Patent: Aug. 4, 1998

[54] COMBINED RAMJET AND ROCKET ENGINE HAVING RECTILINEAR DUCT

[76] Inventor: Russell Fougerousse, 7921 Cherry Brook Dr., Elverta, Calif. 95626

[21] Appl. No.: 644,506

[22] Filed: May 10, 1996

[51] Int. Cl.[6] .................................................. F02K 7/18
[52] U.S. Cl. ............................ 60/225; 60/244; 137/15.1
[58] Field of Search ............................ 60/224, 225, 244, 60/245, 250, 251; 137/15.1, 15.2; 244/53.13

[56] References Cited

U.S. PATENT DOCUMENTS

| | | |
|---|---|---|
| 3,173,249 | 3/1965 | Wiggins . |
| 3,439,692 | 4/1969 | Pike ...................................... 137/15.2 |
| 3,447,325 | 6/1969 | Tiley ..................................... 137/15.2 |
| 3,526,094 | 9/1970 | De La Goutte . |
| 3,803,837 | 4/1974 | Curran . |
| 4,307,743 | 12/1981 | Dunn ..................................... 137/15.1 |
| 4,327,886 | 5/1982 | Bell . |
| 4,745,740 | 5/1988 | Dunn . |
| 5,078,341 | 1/1992 | Bichler et al. ........................ 137/15.1 |
| 5,094,071 | 3/1992 | Jabs . |
| 5,125,229 | 6/1992 | Coleno . |
| 5,343,698 | 9/1994 | Porter . |

*Primary Examiner*—Louis J. Casaregola
*Attorney, Agent, or Firm*—Townsend and Townsend and Crew LLP

[57] ABSTRACT

A combined ramjet and rocket engine, operates as a ramjet in atmosphere, and a rocket engine in space is provided with a rectilinear duct. The engine has interior of the rectilinear duct paired and hinged rectilinear baffles which move from one of the duct walls. These hinged rectilinear baffles move into and out of the planar duct wall and define both the constriction of the Venturi for the ramjet engine configuration or the closure of the duct for the rocket engine configuration. The hinged rectilinear baffles are given leading and trailing wall surfaces so that during movement within the duct for the ramjet configuration, alteration of the slope of the collector and diffuser of the Venturi can occur. The hinged rectilinear baffle bordering the diffuser is manifolded to supply fuel when the engine is ramjet configured and fuel and oxidant when the engine is rocket engine configured. The manifolded baffle bordering the diffuser is directly exposed to combustion and serves to preheat the fuel and/or oxidant flow.

4 Claims, 5 Drawing Sheets

COMBINED RAMJET AND ROCKET ENGINE HAVING RECTILINEAR DUCT

This invention relates to combined ramjet and rocket engines, these engines operating as a ramjet in atmosphere, and a rocket engine in space. The engine is supplied with rectilinear ducting in which moving rectilinear baffles within the rectilinear duct defines the constriction of the Venturi for the ramjet engine configuration or closes the duct for the rocket engine configuration. The rectilinear baffle adjacent the combustion chamber of the engine is manifolded to supply fuel when the engine is ramjet configured and fuel and oxidant when the engine is rocket engine configured.

BACKGROUND OF THE INVENTION

Combined ramjet and rocket engines are known. Such engines operate in the ramjet mode when in atmosphere, and the rocket engine mode when insufficient atmosphere is present to provide an oxidant sufficient to provide propulsion.

Ramjet engines require a Venturi flow. To define the terms utilized herein, the respective sections of the Venturi will be defined. These respective defined sections are the collector section, the constriction, and the diffuser.

The leading portion of a Venturi will be referred to herein as the collector section. Air is initially inlet to the collector section of the Venturi at an inlet having a relatively broad area. The collector has gradually decreasing area passing from the inlet to the Venturi constriction. As air passes from the inlet of the collector section to the constriction of the Venturi, less area is available for airflow. As a consequence, the flow of air gathers speed as the constriction of the Venturi is reached.

The constriction of the Venturi constitutes the narrowest portion of the Venturi. At the constriction, air has high velocity—and as is well known—lower pressure.

Finally, air leaves the Venturi through the diffuser section. This diffuser section has rapidly increasing area passing from the constriction to the Venturi outlet. By confining the combustion thereby controlling the rate of expansion from the Venturi diffuser, energy can be efficiently converted from the high speed flow through the constriction to a slower propelling flow at the Venturi outlet.

Having defined the terms, the prior art relating to the invention can be discussed.

Dual ramjet/rocket engines when operating in the ramjet mode are configured with a Venturi. This Venturi has a collector section in which forced incoming air is provided with higher velocity and passes to the constriction of the Venturi. Fuel is added to the passing air after the high speed air passes the constriction of the Venturi. Given a sufficient velocity of air flow, when the air and fuel is combusted, the air flow mechanics at the Venturi constriction function as a check valve; air can only exit the Venturi diffuser, air cannot reverse direction and again pass through the constriction of the Venturi to the collector. Presuming that there is an inflow of air passing at a sufficiently high speed flow to produce the desired one way fluid flow characteristic of the passing stream through the constriction, propulsion results.

Such ramjet engines have heretofore been provided with circular ducting. Over the invention which is set forth hereafter, circular ducting has disadvantages.

First, circular ducts can only be valved by so-called "iris" type valves. In such valves, a series of radially moving plates either partially or totally constrict the circular sectioned ducts.

Second, circular ducts cannot have Venturi formed within such ducts changed in slope and flow through aperture. In short, any configuration of Venturi is effectively permanent with respect to the circular duct to which it is mounted.

Presuming that a ramjet powered aircraft is (rapidly) changing altitude, such as during ascent, air density rapidly changes. It is frequently desirable to reconfigure the Venturi as air density declines. At present, reconfiguration of the Venturi is not possible in a ramjet engine. By reconfiguration, I mean that the slope of the collector and the diffuser portions of the Venturi should be dynamically adjustable along with the total area of the constriction. This enables the entirety of the Venturi to be optimally configured for the particular air density (then) being encountered.

Second and presuming that rapid ascent continues, eventually air density decreases to that level where a jet engine requiring oxidant from the atmosphere is no longer operable. When this occurs, only a rocket engine is suitable. At the present time, provision has been made for the closure of circular ducts; such closure requires valves of the iris configuration. These iris type valves add considerable complexity.

SUMMARY OF THE INVENTION

A combined ramjet and rocket engine—operating as a ramjet in atmosphere, and a rocket engine in space—is provided with a rectilinear duct. The engine has interior of the rectilinear duct paired and hinged rectilinear baffles which move from one of the planar duct walls. These hinged rectilinear baffles move into and out of the planar duct wall and define both the constriction of the Venturi for the ramjet engine configuration or the closure of the duct for the rocket engine configuration. The hinged rectilinear baffles are given leading and trailing wall surfaces so that during movement within the duct for the ramjet configuration, alteration of the slope of the collector and diffuser of the Venturi can occur. The hinged rectilinear baffle bordering the diffuser is manifolded to supply fuel when the engine is ramjet configured and fuel and oxidant when the engine is rocket engine configured. The manifolded baffle bordering the diffuser is directly exposed to combustion and serves to pre-heat the fuel and/or oxidant flow.

DESCRIPTION OF THE PREFERRED EMBODIMENT

Figure 1A:
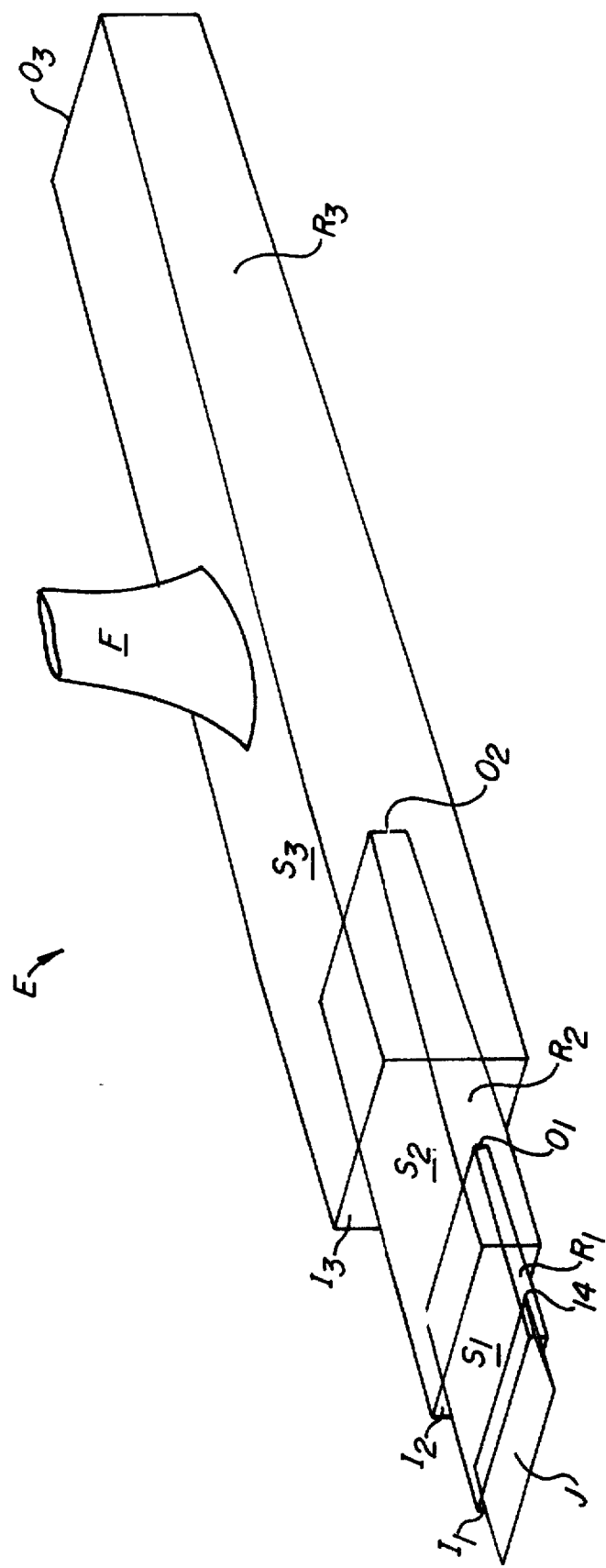
FIG. 1A is a perspective schematic of a multi-stage engine according to the invention constructed with the rectilinear ducting of this invention, the engine here being shown with a schematic fairing for connection to an aircraft and configured for ramjet operation.
Figure 4:
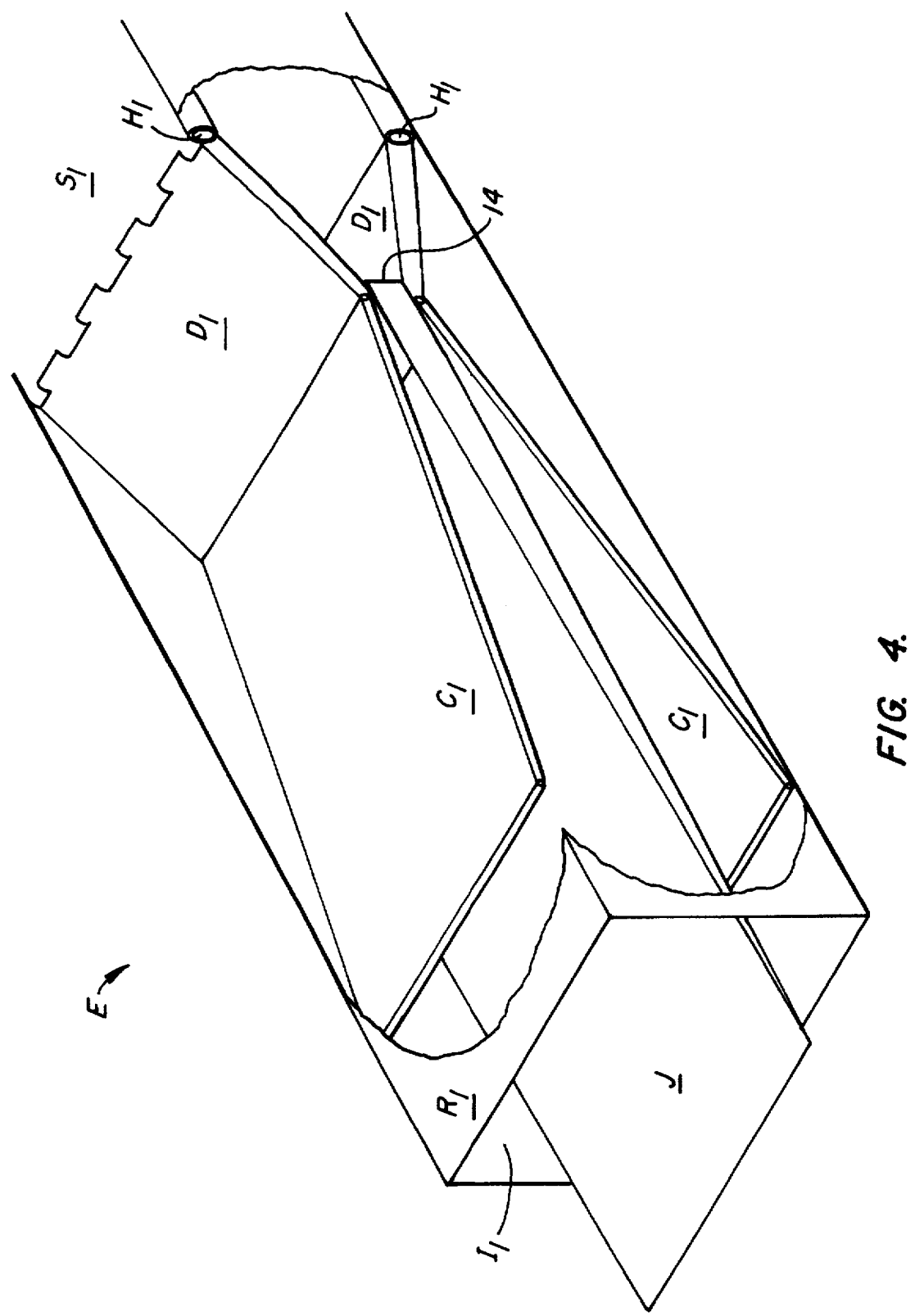
FIG. 4 is a further perspective view of the engine.

Referring to FIG. 1A, engine E according to this invention is disclosed disposed in the ramjet mode. Specifically, injector J has outlet 14 for starting the multistage engine (See FIG. 4). Outlet 14 discharges to inlet $I_1$ of first stage $S_1$. First stage $S_1$ has outlet $O_1$ discharging to inlet $I_2$ of second stage $S_2$.

Likewise, second stage $S_2$ has outlet $O_2$ discharging to inlet $I_3$ of third and final stage $S_3$. Third and final stage $S_3$ discharges at outlet $O_3$ to atmosphere providing propulsion from engine E.

As is common, fairing F (only partially shown) mounts engine E to an aircraft (not shown). In the case of engine E, the aircraft provides a supply of fuel through fuel line 16 and oxidant through oxidant line 18. (See FIG. 3) The delivery of fuel and oxidant for combustion in engine E will be later set forth. The immediately following description will illustrate the manifolding of diffuser baffle $D_1$, diffuser baffle $D_2$, and diffuser baffle $D_3$ to provide the engine with either fuel for operation in the ramjet mode or fuel and oxidant for operation in the rocket engine mode.

Presuming that the propelled aircraft ascends to a sufficient height and passes out of sufficient atmosphere to support ramjet combustion, engine E must be reconfigured to the rocket engine mode. This can be seen in the schematic mode as set forth in FIG. 1B.

Figure 1B:
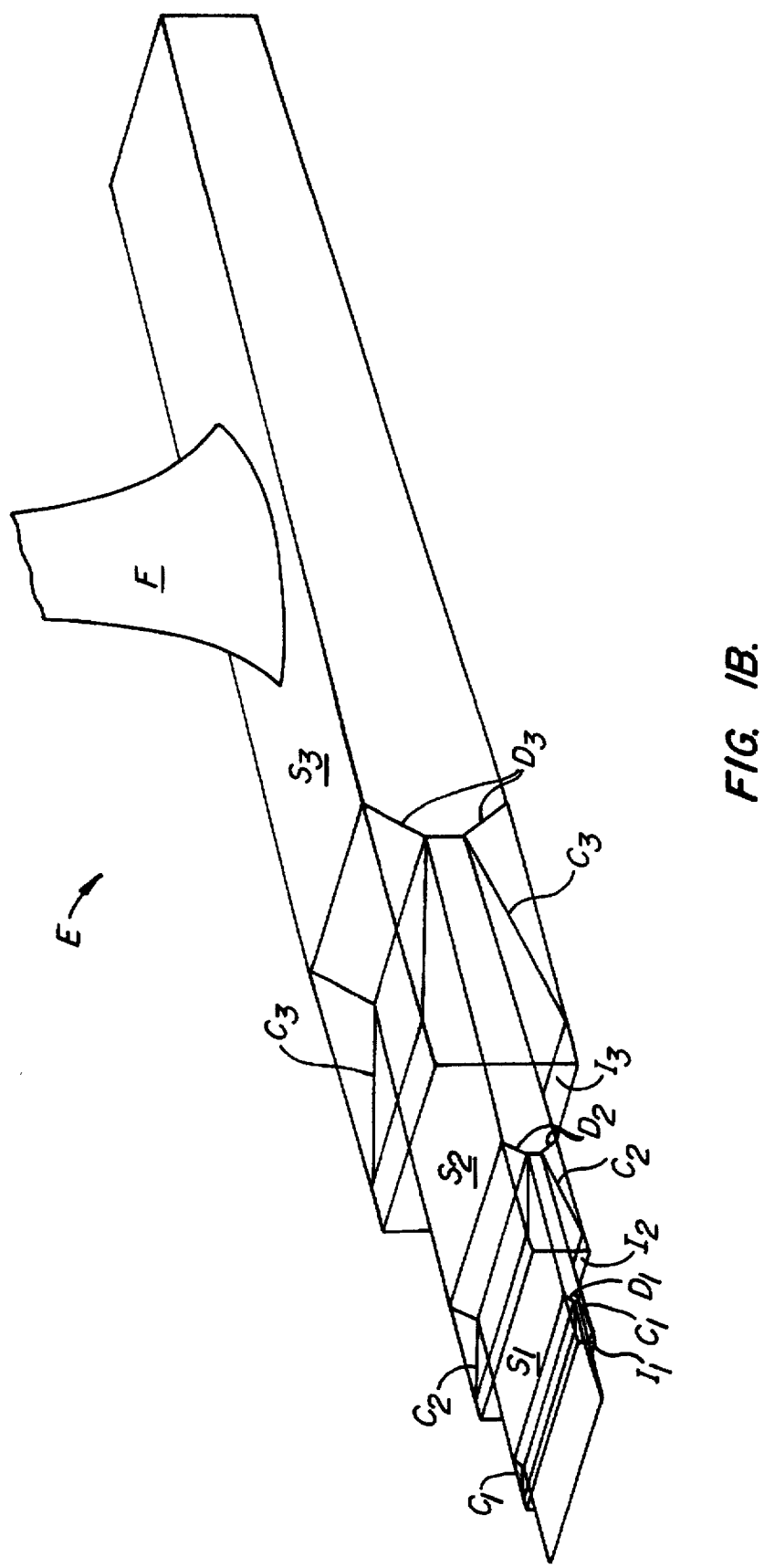
FIG. 1B is a perspective schematic similar to FIG. 1A with the illustrated engine configured for rocket operation.

Continuing on with FIG. 1B, it will be seen that each of first stage $S_1$, second stage $S_2$, and third and final stage $S_3$ is closed at respective inlet $I_1$, inlet $I_2$, and inlet $I_3$. Such closure occurs by movement of collector baffle $C_1$ and diffuser baffle $D_1$ of first stage $S_1$, collector baffle $C_2$ and diffuser baffle $D_2$ of second stage $S_2$, and collector baffle $C_3$ and diffuser baffle $D_3$ of third and final stage $S_3$ to totally block the rectilinear duct (see also FIG. 4).

To fully understand this invention, the configuration of rectilinear duct $R_1$ for first stage $S_1$, rectilinear duct $R_2$ for second stage $S_2$, a detailed description of only collector baffle $C_3$ and diffuser baffle $D_3$ will be offered.

Figure 2:
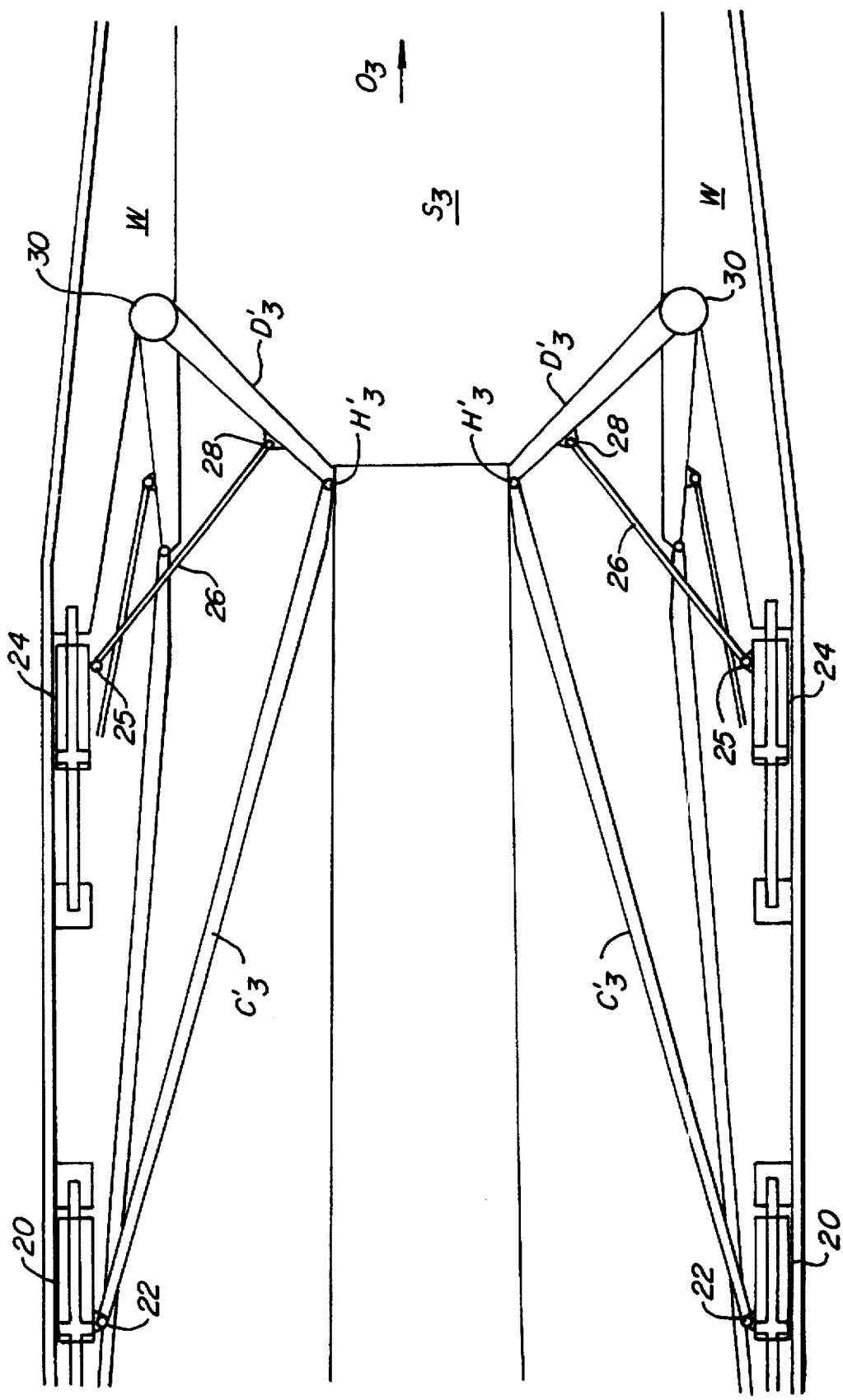
FIG. 2 is a side elevation section with respect to the perspective view of FIG. 1B illustrating the relative movement of the hinged rectilinear baffles to define a variable section Venturi with respect to the rectilinear duct wall and showing the range of motion of the hinged baffles from being fully open to complete closure of the duct for the rocket engine configuration; and, FIG. 3 is a cut away view to the closing flap for exposure to the combustion chamber of either the ramjet or rocket engine with the rectilinear closing flap having the dual capability of providing fuel alone for ramjet propulsion or an oxidant and fuel for rocket engine propulsion.

With reference to FIG. 2, a side elevation section of third and final stage $S_3$ is illustrated. This stage $S_3$ includes collector baffle $C_3$ and diffuser baffle $D_3$ joined by hinge $H_3$. Diffuser baffle $D_3$ connects to wall W at fixed wall hinge 30. Two positions of collector baffle $C_3$ and diffuser baffle $D_3$ are shown relative to fixed wall hinge 30. First, and with reference to collector baffle $C_3'$, diffuser baffle $D_3'$, and hinge $H_3'$, a configuration of engine E to the rocket engine mode is shown.

Referring to the illustrated $C_3'$, $D_3'$, $H_3'$ defined rocket engine mode of the engine, it will be seen that collector baffle $C_3'$ exceeds in length diffuser baffle $D_3'$. This effectively gives the collector of the Venturi a gradual slope to the engine constriction defined by hinge $H_3'$. Secondly, it will be observed that the respective collector baffle $C_3$, and diffuser baffle $D_3$ move out of wall W of third and final stage $S_3$.

Movement of collector baffle $C_3$ of third and final stage $S_3$ occurs under actuation of two hydraulic cylinders. Baffle hydraulic cylinder 20 acts against collector baffle $C_3$ at hinge point 22 on baffle hydraulic cylinder 20. Likewise, diffuser wall hydraulic cylinder 24 acts through diffuser baffle rod 26 via rod connection 25 at the cylinder and diffuser section baffle connection 28 at diffuser baffle $D_3$.

Required movement for change of the constriction of the Venturi is simple to understand. When baffle hydraulic cylinder 20 and diffuser wall hydraulic cylinder 24 move towards outlet $O_3$, closure occurs. When baffle hydraulic cylinder 20 and diffuser wall hydraulic cylinder 24 move away from outlet $O_3$, opening of the constriction occurs. At the same time, the respective slope of the collector and the diffuser occurs, adjusting the overall parameters of the ramjet.

There remains only to discuss the introduction of fuel for the ramjet and fuel and oxidant for the rocket engine through diffuser baffle $D_1$ for first stage $S_1$, through diffuser baffle $D_2$ for second stage $S_2$, and diffuser baffle $D_3$ for third and final stage $S_3$. For purposes of example, I will only discuss diffuser baffle $D_3$ as the remaining baffles are similar.

Figure 3:
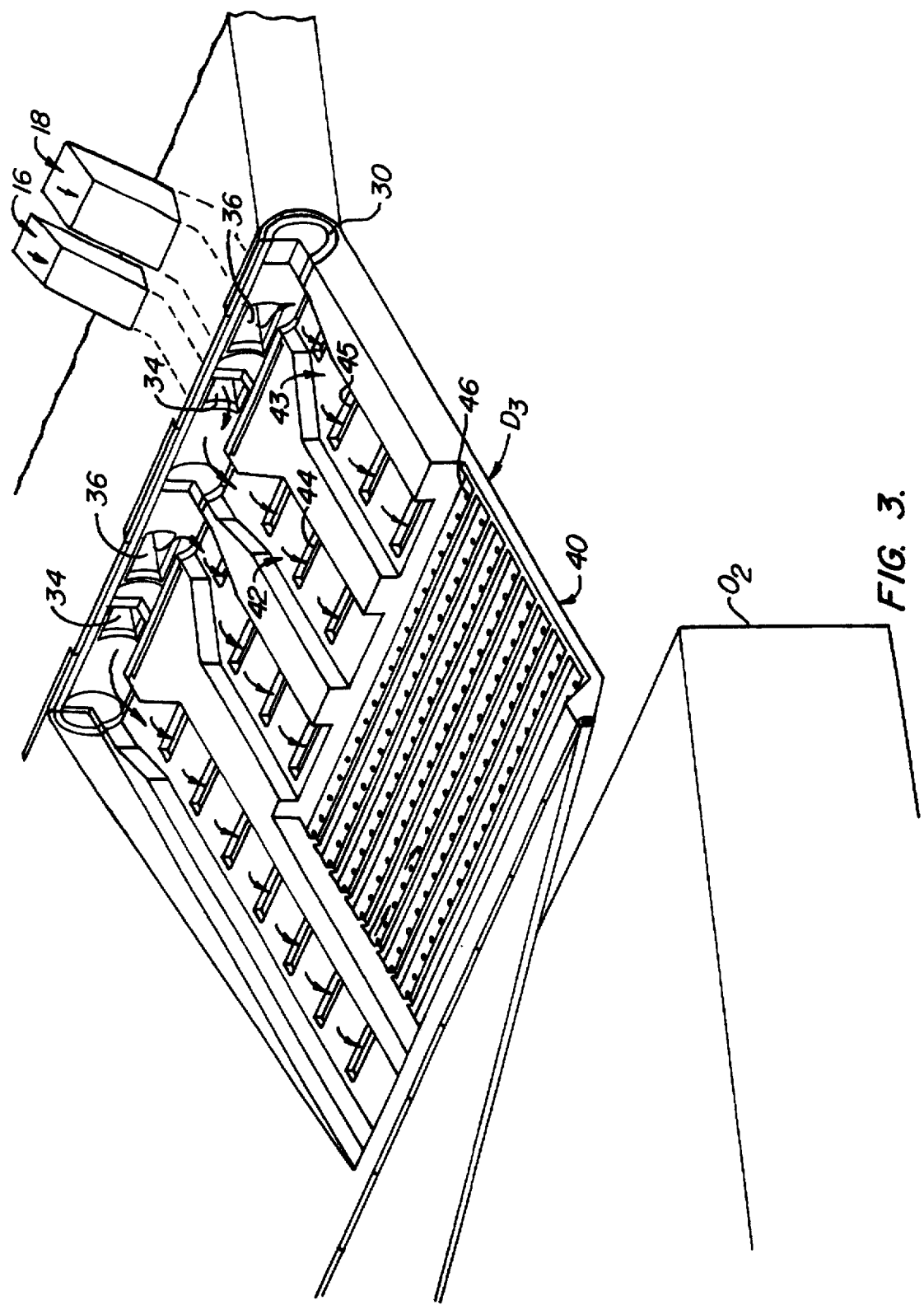

Referring to FIG. 3, diffuser baffle $D_3$ is shown from the inside of wall W (not shown), looking down at the top of the baffle. Three relevant broken away sections are illustrated. First, referring to fixed wall hinge 30, this hinge includes fuel inlets 34 and oxidant inlets 36. Second, these respective inlets 34, 36 communicate through inlet manifolds to combustion chamber exposed surface 40 of diffuser baffle $D_3$. Finally and third, fuel and/or fuel and oxidant passes through diffuser baffle $D_3$ and into the combustion chamber.

Starting at hinge 30, inlet 34 communicates to diffuser panel channel 42 and then to diffuser panel outlet port 44. At diffuser panel outlet port 44 communication occurs directly to panel outlets 46. Likewise, inlet 36 communicates to diffuser panel channel 43 communicates from oxidant inlets 36 to diffuser panel outlet port 45. At diffuser panel outlet port 45 communication to panel outlets 46 occurs. Thus, it will be understood that from fuel line 16 and oxidant line 18, communication to respective fuel inlets 34 and oxidant inlets 36 occurs dependent upon the particular mode of operation of engine E. Since the conduits extending from fuel line 16 to fuel inlets 34 and oxidant line 18 to oxidant inlets 36 are conventional, further discussion will be omitted.

It will be observed that diffuser panel outlet port 44 for fuel and diffuser panel outlet port 45 are staggered. This assures that alternate rows of outlets 46 receive respectively fuel and oxidant.

It will be understood that this arrangement includes several advantages. First, fuel and oxidant being supplied to the respective stages is pre-heated. Second, and because the fuel and oxidant in effect evacuates heat, the respective diffuser baffles $D_1$, $D_2$, and $D_3$ are cooled. As the panels are immediate the combustion occurring within the diffuser of the Venturis, such cooling is particularly advantageous.

What is claimed is:

1. A combination ramjet and rocket engine comprising:

a rectilinear duct defined by upper and lower parallel walls and left and right parallel walls, the rectilinear duct having an intake, an outlet, and a combustion chamber between the intake and the outlet;

at least a forward rectilinear baffle and rear rectilinear baffle, the forward rectilinear baffle and the rear rectilinear baffle each having first and second sides with parallel edges adjacent the left and right parallel walls of the rectilinear duct respectively, each forward rectilinear baffle and each rear rectilinear baffle having sufficient dimension between to fully block the rectilinear duct between the left and right parallel walls when disposed across the rectilinear duct between the left and right parallel walls;

a hinge joining the forward rectilinear baffle at a rear edge to the rear rectilinear baffle at a forward edge;

means mounting at least one of the forward and rear rectilinear baffles at a parallel edge opposite the hinge for hinged movement with respect to one wall of the rectilinear ducts means mounting the other of the forward and rear rectilinear baffles at a parallel edge opposite the hinge for sliding movement with respect to one wall of the rectilinear duct;

means for moving the forward rectilinear baffle and the rear rectilinear baffle at the hinge towards and away from a position fully blocking the rectilinear duct to a position adjacent a wall of the rectilinear duct whereby the baffles when moved away from fully blocking the rectilinear duct form a venturi having a collector adjacent the inlet, a constriction, and diffuser adjacent the outlet; and, means for supplying fuel to the combustion chamber of the engine in the rear rectilinear baffle adjacent the diffuser.

2. A combination ramjet and rocket engine according to claim 1 and further comprising:

the intake of the engine includes an outlet from a first smaller and preceding engine located centrally of the intake and defining first and second rectilinear ducts on either side of the outlet from the first smaller and previous engine, each of the first and second rectilinear ducts having a forward rectilinear baffle and a rear rectilinear baffle.

3. A combination ramjet and rocket engine according to claim 1 and further comprising:

the means for supplying fuel to the combustion chamber of the engine includes means for supplying an oxidant.

4. A combination ramjet and rocket engine according to claim 2 and further comprising:

the rectilinear duct at the intake includes an outlet from an engine disposed in front of the inlet.

* * * * *